M. H. THOMS.
VALVE.
APPLICATION FILED APR. 6, 1916.
1,193,738.
Patented Aug. 8, 1916.
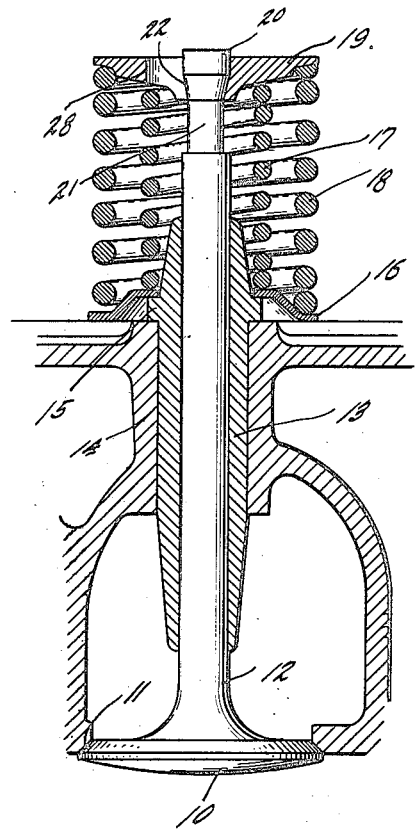
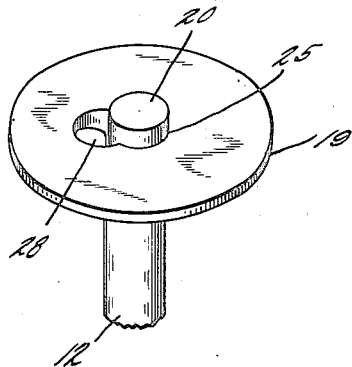
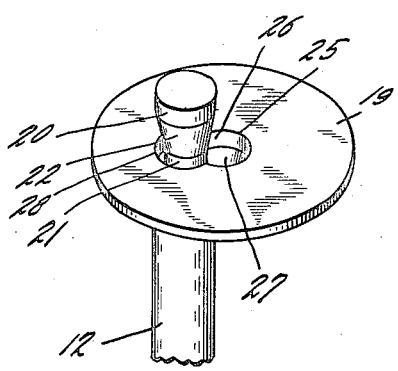
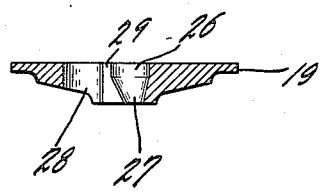
WITNESSES:
INVENTOR
Max K. Thoms,
BY
Hood & Schley
ATTORNEYS

UNITED STATES PATENT OFFICE.

MAX H. THOMS, OF INDIANAPOLIS, INDIANA, ASSIGNOR TO HOWARD MARMON.

VALVE.

1,193,738.  Specification of Letters Patent.  Patented Aug. 8, 1916.

Application filed April 6, 1916.  Serial No. 89,448.

*To all whom it may concern:*

Be it known that I, MAX H. THOMS, a citizen of the United States, residing at Indianapolis, in the county of Marion and State of Indiana, have invented a new and useful Valve, of which the following is a specification.

It is the object of my invention to provide a valve and valve stem, and a spring-retaining washer, particularly for a valve-in-head motor, wherein the washer and valve stem are interlocked without any additional parts, by the mere pressure of the spring, and the washer can nevertheless be readily removed and replaced.

The accompanying drawing illustrates my invention.

Figure 1 is a longitudinal central section through a valve stem and its washer, its spring, and its mounting, showing my improved construction; Fig. 2 is a perspective view of the washer and the upper end of the valve stem interlocked; Fig. 3 is a view similar to Fig. 2, showing the upper end of the valve stem and the washer at an intermediate point in the process of being put together or separated; and Fig. 4 is a central section through the washer.

The valve 10 coöperates in the usual manner with the seat 11 and has a stem 12 which is slidably mounted in a bushing 13 suitably supported in the cylinder head 14, which is shown as having the usual water-circulating passages, but may be of any suitable form. The bushing 13 is provided with a collar 15 for holding it in place. A pressed sheet metal washer 16 fits against the outer face of this shoulder and against the outer surface of the cylinder head, as clear from Fig. 1, and one or more compression springs 17 and 18 act between this pressed sheet metal washer and a washer 19 mounted on the projecting end of the valve stem 12.

The upper part of the valve stem 12 has an end portion 20 of larger diameter, a portion 21 of smaller diameter, and a tapered portion 22 joining the portions 20 and 21. The portion 20 is conveniently of the same diameter as the main body of the valve stem 12, so that the portion 21 is of smaller diameter than the body of the valve stem. The length of the portion 21 is substantially equal to the maximum thickness of the washer 19, and the combined lengths of the portions 20 and 22 are also about equal to or slightly greater than such maximum thickness.

The washer 19 has a central hole 25 which has an upper portion 26 of proper diameter to fit the portion 20 of the valve stem and a lower portion 27 which is tapered to fit the tapered portion 22 of the valve stem, so that the hole 25 as a whole is too small to allow the passage therethrough of the portion 20, but fits the portions 20 and 22 so that when such valve stem portions are seated in the portions 26 and 27 of the hole 25 the washer is firmly positioned. The washer 19 also has a second hole 28 which is laterally displaced from the center of the washer and is larger in diameter throughout than is the portion 20 of the valve stem. In consequence, such portion 20 can pass freely through the hole 28. The holes 25 and 28 overlap, forming between them a contracted neck 29 which is of greater width than the diameter of the portion 21 of the valve stem. In consequence, when the washer 19 is pushed down into the place of the portion 21 of the valve stem, such portion can be passed through this neck 29 to bring the valve stem into either the hole 25 or the hole 28. When in the hole 28, the washer may be removed from or placed on the valve stem, but when in the hole 25 it is held firmly against removal. When assembled in this latter position, the action of the springs 17 and 18 on the washer 19 holds the valve stem portions 20 and 22 firmly seated in the hole portions 26 and 27 of the hole 25 in the washer 19. Thus to put the washer 19 in place on the valve stem, it is merely necessary to force it downward against the pressure of the springs 17 and 18 with the valve stem in line with the hole 28, until the valve stem is brought to the plane of the portion 21, whereupon by a lateral movement of the washer such portion is passed through the neck 29 and the valve stem brought into alinement with the hole 25. Upon now releasing the washer 19, the springs 17 and 18 force it outward to seat the upper end of the valve stem firmly in the hole 25. The washer 19 may be removed by the reverse of this operation.

I claim as my invention:

1. A one piece valve and valve stem, the end part of the valve stem opposite the valve having an end portion of larger diameter, a portion of smaller diameter removed from such end portion, and a tapered portion joining said larger and smaller portions, in combination with a spring-retaining washer having a hole portions of which fit said larger and tapering portions respectively of said valve stem, and a second hole of sufficient size throughout to allow the passage of said larger portion, said two holes being joined by a contracted passageway of sufficient size to allow the passage of said smaller stem portion from one hole to the other, and a spring tending to force said washer along said valve stem away from said valve.

2. A valve and valve stem, the end part of the valve stem opposite the valve having an end portion of larger diameter, a portion of smaller diameter removed from such end portion, and a tapered portion joining said larger and smaller portions, in combination with a spring-retaining washer having a hole portions of which fit said larger and tapering portions respectively of said valve stem, and a second hole of sufficient size throughout to allow the passage of said larger portion, said two holes being joined by a contracted passageway of sufficient size to allow the passage of said smaller stem portion from one hole to the other, and a spring tending to force said washer along said valve stem away from said valve.

3. A one piece valve and valve stem, the end part of the valve stem opposite the valve having an end portion of larger diameter and a portion of smaller diameter removed from such end portion, in combination with a spring-retaining washer having a hole one portion of which fits said larger portion of the valve stem and another portion of which is smaller than said larger portion so that the larger portion in its entirety cannot pass through such hole of said valve stem, and a second hole of sufficient size throughout to allow the passage of said larger portion, said two holes being joined by a contracted passageway of sufficient size to allow the passage of washer along said valve stem away from said valve.

4. A valve and valve stem, the end part of the valve stem opposite the valve having an end portion of larger diameter and a portion of smaller diameter removed from such end portion, in combination with a spring-retaining washer having a hole one portion of which fits said larger portion of the valve stem and another portion of which is smaller than said larger portion so that the larger portion in its entirety cannot pass through such hole of said valve stem, and a second hole of sufficient size throughout to allow the passage of said larger portion, said two holes being joined by a contracted passageway of sufficient size to allow the passage of said smaller stem portion from one hole to the other, and a spring tending to force said washer along said valve stem away from said valve.

5. A one piece valve and valve stem, the end part of the valve stem opposite the valve being provided with a head which is larger than a portion of the valve stem between it and the valve, in combination with a spring-retaining washer having two holes one of which is large enough to allow the passage of said head and the other of which is too small to allow the passage of said head, the two holes being connected by a narrow neck sufficiently large to permit the passage therethrough from one hole to the other of the valve stem portion which is smaller than said head.

6. A valve and valve stem, the end part of the valve stem opposite the valve being provided with a head which is larger than a portion of the valve stem between it and the valve, in combination with a spring-retaining washer having two holes one of which is large enough to allow the passage of said head and the other of which is too small to allow the passage of said head, the two holes being connected by a narrow neck sufficiently large to permit the passage therethrough from one hole to the other of the valve stem portion which is smaller than said head.

In witness whereof, I have hereunto set my hand at Indianapolis, Indiana, this 3d day of April, A. D. one thousand nine hundred and sixteen.

MAX H. THOMS.

Witnesses:
R. M. MUELLER,
L. E. DINKINS.